United States Patent [19]

Wagner

[11] Patent Number: 4,787,772

[45] Date of Patent: Nov. 29, 1988

[54] DEVICE FOR DETECTING LEAKS IN UNDERGROUND FLUID TANKS

[75] Inventor: Richard Wagner, Denver, Colo.

[73] Assignee: Eljen Corporation, Storrs, Conn.

[21] Appl. No.: 67,639

[22] Filed: Jun. 26, 1987

[51] Int. Cl.⁴ .......................... E02D 3/00; E02B 3/16
[52] U.S. Cl. ........................................ 405/53; 73/49.2; 405/128
[58] Field of Search ................ 405/52, 53, 128, 54, 405/55, 58, 59; 73/49.2 T

[56] References Cited

U.S. PATENT DOCUMENTS

| 2,924,352 | 2/1960 | Santner et al. | 73/49.2 TX |
|---|---|---|---|
| 3,505,820 | 4/1970 | Draper et al. | 405/53 |
| 3,695,289 | 10/1972 | Capdevielle et al. | 405/59 X |
| 3,848,765 | 11/1974 | Durkop | 73/49.2 TX |
| 3,995,472 | 12/1976 | Murray | 73/49.2 TX |
| 4,110,947 | 9/1978 | Murray et al. | 405/54 X |
| 4,352,601 | 10/1982 | Valiga et al. | 405/128 X |
| 4,464,081 | 8/1984 | Hillier et al. | 405/53 X |
| 4,490,072 | 12/1984 | Glasser | 405/45 |
| 4,543,013 | 9/1985 | Wagner et al. | 405/128 |
| 4,638,920 | 1/1987 | Goodhues | 73/49.2 TX |
| 4,639,164 | 1/1987 | Pugnale et al. | 405/54 |
| 4,678,369 | 7/1987 | Glaser | 405/128 X |
| 4,682,492 | 7/1987 | Green | 73/49.2 T |

FOREIGN PATENT DOCUMENTS 0135930 8/1983 Japan ............................ 73/49.2 T Primary Examiner—Dennis L. Taylor
Attorney, Agent, or Firm—McCormick, Paulding & Huber

[57] ABSTRACT

The device for detecting leaks in an underground fluid tank includes a tank liner extending across the bottom of the tank and upwardly substantially surrounding the sides of the tank. The tank liner includes a stiff plastic core having a surface defining a plurality of fluid passageways which is oriented tangentially to a drain pipe arranged below the tank and along the length of the tank and which has slots to provide passageways for fluid entering into the pipe. A permeable plastic membrane is wrapped around the core and the pipe to prevent fill from filling the passageways so defined. A leak tank is connected to the drain pipe for receiving fluid therefrom, and a pump is mounted in the leak tank to pump the fluid to a surface tank for inspection.

7 Claims, 2 Drawing Sheets

DEVICE FOR DETECTING LEAKS IN UNDERGROUND FLUID TANKS

BACKGROUND OF THE INVENTION

The present invention relates to devices for detecting fluid leaks in underground tanks and deals more particularly with such a device utilizing an underground tank liner having a fluid drainage core and providing a drainage pipe below the core and a leak tank connected to the drainage pipe for receiving fluid therefrom.

Leaking underground tanks containing gasoline, diesel fuel, other petroleum products or liquid wastes present a substantial threat to the quality of underlying ground water. Aging underground tanks are known to develop leaks due to corrosion or faulty installation. Accordingly, such leaks contribute substantially to groundwater contamination.

With the known underground tank constructions relatively small leaks in the tank will go undetected. Such leaks are generally not noticed until they become large enough to develop a noticeable decrease in the fluid level of the tank, or until enough surrounding land fill enters the tank through the leak to become detected on the bottom of the tank or suspended in the fluid within the tank. In the meantime the fluid leaking from the tank can cause a substantial degree of contamination to the groundwater in the vicinity of the tank.

It is accordingly an object of the invention to provide a device for detecting leaks in underground fluid tanks.

It is a further object of the invention to provide a device for detecting relatively small leaks in underground fluid tanks and for capturing any fluid leaking from the tank.

Other objects and advantages of the invention will be apparent from the following description and accompanying drawings which are a part thereof.

SUMMARY OF THE INVENTION

In accordance with the invention a device for detecting leaks in an underground fluid tank includes an axially elongated drain pipe arranged below the tank and extending across the length of the tank. The drain pipe has openings spaced along its length to provide passageways for fluid to pass into the interior of the pipe.

A tank liner of the device extends across the bottom of the tank and also extends upwardly substantially surrounding the sides of the tank. The tank liner includes a fluid impervious core arranged tangentially to the drain pipe and a sheet of fluid pervious material wrapped around both the core and the drain pipe. The core comprises opposing surfaces wherein one of the surfaces faces the tank and the other surface faces away from the tank. Both surfaces define a plurality of fluid passageways for directing fluid across the surface facing the tank and into the openings in the drain pipe. The sheet material operates to prevent surrounding underground fill material from plugging both the fluid passageways defined by the core and the openings in the drain pipe.

A leak tank of the device is provided at a downstream end of the drain pipe for receiving fluid therefrom, and the device further comprises means for determining if fluid from the fluid tank has entered the leak tank.

DETAILED DESCRIPTION OF THE PREFERRED EMBODIMENT

Figure 1:
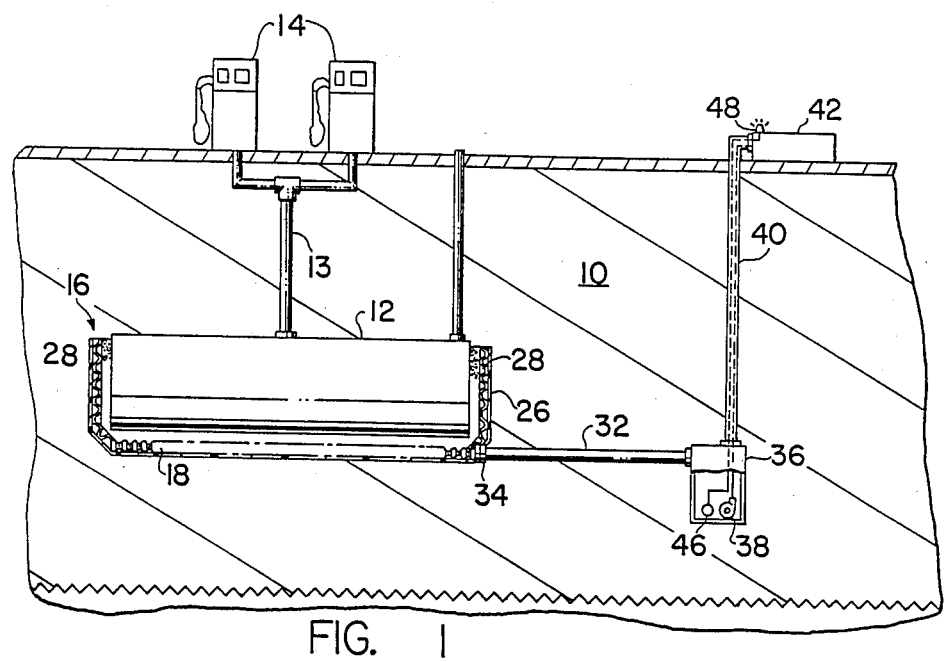
FIG. 1 is a side elevational view of a preferred embodiment of the invention adapted for detecting fluid leaks from an underground fuel tank.

Referring to FIG. 1, a device for detecting fluid leaks is illustrated generally at 10 and as shown this device is arranged for detecting leaks from an underground fuel tank 12. The tank 12 is adapted to contain gasoline or diesel fuel and is connected by means of a fuel line 13 to several fuel pumps 14,14 of the type used in a typical gasoline filling station. Although the device 10 is shown for detecting leaks in an underground fuel tank it is equally suitable for detecting leaks in other types of underground fluid tanks, such as, for example, industrial waste tanks.

The device 10 includes a tank liner 16 provided for capturing fuel or other fluid leaking from the generally cylindrical tank 12. The construction of the tank liner 16 is known, and is employed in fluid drainage devices generally used for carrying away subsurface water in the vicinity of a foundation or the like, and is described in the patent to Glasser, U.S. Pat. No. 4,490,072, issued on Dec. 25, 1984 which patent is hereby incorporated by reference as part of the present disclosure.

Figure 2:
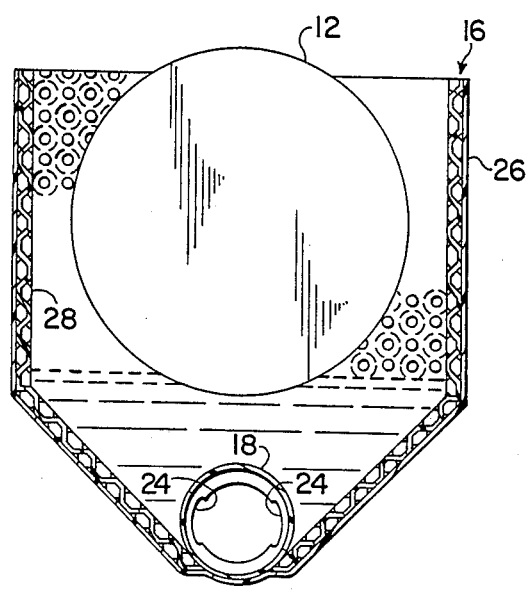
FIG. 2 is an end elevational view of the tank liner of the device of FIG. 1 shown partially in section.
Figure 3:
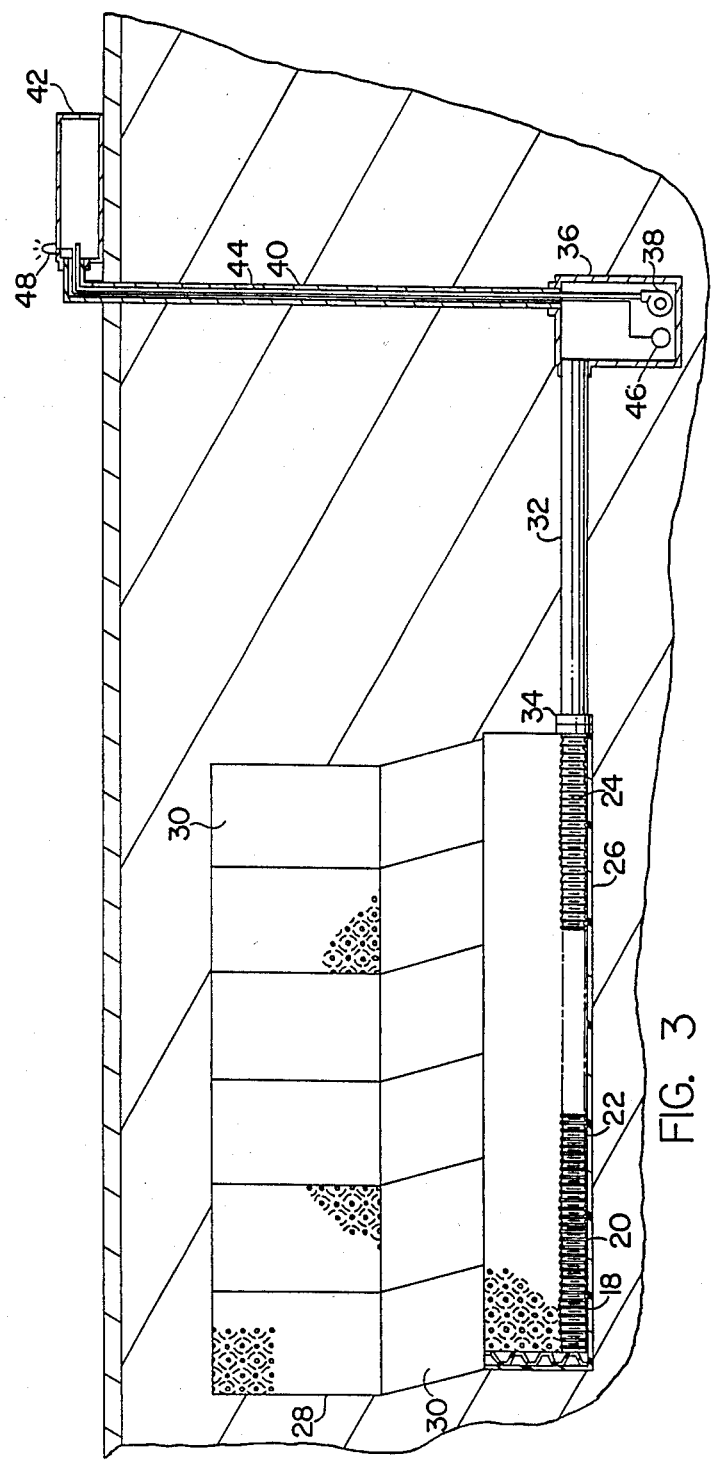
FIG. 3 is a side elevational view of the device of FIG. 1 with portions broken away to reveal the core and the drain pipe of the tank liner of the device.

Thus, the tank liner 16 is made up from a plurality of panels as illustrated in FIG. 3 and at least one drain pipe 18 is arranged below the tank 12 and extends along the length of the tank parallel the tank's axial direction. The drain pipe 18 comprises axially spaced radially outwardly extending portions 20 defining valleys 22 therebetween, and with slots 24 provided in the valleys for the passage of fluid into the interior of the pipe. The drain pipe 18 is preferably provided in a lower portion of a nonwoven envelope 26 which is made of a porous filtering material that permits the passage of fluid therethrough but prevents the surrounding landfill material from entering. Inside the envelope 26 a fluid impervious core 28 is provided and this core extends alongside the drain pipe 18, and is generally tangentially arranged with respect to the pipe. The core 28 extends below the bottom of the tank 12 and also extends upwardly surrounding a substantial portion of the sides of the tank. The core 28 preferably comprises a plurality of core panels 30,30 that are nested with one another and which are each generally rectangular in shape but may vary in their rectangular dimensions. As so arranged, that is with these panels surrounding a substantial portion of the tank as shown in FIGS. 2 and 3 any fluid from the tank will tend to flow downwardly toward the drain pipe 18 and be carried away toward a collection station to be described. The core panels 30,30 are made of a plastic sheet material and are formed to define spaced valleys and raised portions therein as suggested in FIG. 2 and in the prior U.S. Pat. No. 4,490,072. The assembly of the filter material 26, the core 28 and the drain pipe 18 provide a plurality of passageways for downwardly flowing fuel or other fluid leaking from or around the tank 12 and for directing the fluid to the pipe 18 and thence into the slots 24 defined in the pipe so that the fluid can be carried away inside the pipe as will be hereinafter further described.

Fluid flowing from the split drain pipe 18 is directed into a solid drain pipe 32 of the device which is connected to the downstream end of the pipe 18 by means of a pipe coupling 34. The solid pipe 32 is connected at its downstream end to an underground leak tank 36 of the device. As can be seen, any fluid leaking from the tank 12 flows downwardly and is captured by the liner 16 and split drain pipe 18 and directed into the solid drain pipe 32 and thence into the leak tank 36.

The device 10 further comprises a sump pump 38 mounted inside the leak tank 36 and a test pipe 40 connected at one end to the leak tank and extending upwardly to the ground level. At ground level a surface inspection tank 42 of the device is connected to the end of the test pipe 40. A pump hose 44 of the pump 38 is connected to the outlet of the pump and extends upwardly through the test pipe 40 and into the surface inspection tank. The sump pump 38 automatically operates to pump fluid from the leak tank 36 to the inspection tank 42 when the fluid level in the leak tank reaches the pump's activation height. The fluid pumped into the inspection tank may then be inspected to determine the degree of leakage from the underground tank 12. In a similar manner, the leak tank 36 may be inspected by running water into the leak tank through the test pipe 40 to actuate the pump 38 so as to pump the water and any fuel or other fluid residue from the leak tank to the surface tank for inspection.

The device 10 further comprises a fuel sensor 46 of a type known in the art which is mounted within the leak tank 36 for actuation when the presence fuel in the leak tank is detected. The fuel sensor 46 is in turn connected to a warning light 48 mounted on the top of the surface inspection tank 42. The fuel sensor 46 is activated to illuminate the warning light 48 when fuel is detected in the leak tank. Since the liner 16 will capture groundwater between the liner and the tank in addition to any fluid leaking from the tank the sensor 46 operates to warn an inspector at the moment a fuel leak is detected. An inspector may then operate the pump 38 to perform an analysis of the fluid in the leak tank and determine the necessary corrective action.

I claim:

1. A device for detecting leaks in an underground fluid tank, said device comprising:

an axially elongated drain pipe arranged below the tank, said drain pipe extending along the length of the tank and having openings defined in the side wall of said drain pipe to provide passageways for fluid to pass into the interior thereof;

a tank liner arranged below the tank and extending across the bottom of the tank, said tank liner also extending upwardly along the sides of the tank, said liner having a fluid impervious core arranged generally tangentially to said drain pipe, and a sheet of fluid pervious material wrapper around said core and said drain pipe, said core having opposing surfaces wherein one of said surfaces faces the tank and said other surface faces away from the tank, said surfaces having raised lands and associated valleys defining a plurality of fluid passageways for directing fluid across said one surface facing said tank and into said openings in said pipe, said sheet material also preventing surrounding underground fill material from plugging said fluid passageways defined by said core and said openings in said drain pipe;

an underground leak tank arranged in fluid communication with said drain pipe for receiving fluid therefrom; and sensor means for determining if there is fluid from said fluid tank within said leak tank.

2. A device according to claim 1 further characterized by said core comprising a plurality of sheets each defining said alternate raised land portions and said associated valleys of corresponding configuration, said core sheets being arranged adjacent one another and said fluid pervious sheet wrapped around said core sheets.

3. A device according to claim 3 further characterized by said core sheets being made of plastic.

4. A device according to claim 1 further comprising:
an above-ground inspection tank; and
a pump mounted within said leak tank and arranged in fluid communication with said inspection tank for pumping fluid from said leak tank to said inspection tank.

5. A device according to claim 5 further comprising:
a fuel sensor mounted within said leak tank for detecting fuel within said leak tank.

6. A device according to claim 5 further comprising:
a fuel sensor mounted within said inspection tank for detecting fuel within said inspection tank.

7. A device according to claim 1 further comprising:
a fuel sensor mounted within said leak tank for detecting fuel within said leak tank.

* * * * *